United States Patent [19]

Dubois

[11] Patent Number: 4,916,895
[45] Date of Patent: Apr. 17, 1990

[54] THRUST REVERSE FOR A TURBOFAN ENGINE

[75] Inventor: Claude A. G. Dubois, Honfleur, France

[73] Assignee: Societe anonyme dite Hispano-Suiza, Saint-Cloud, France

[21] Appl. No.: 251,513

[22] Filed: Sep. 30, 1988

[30] Foreign Application Priority Data

Sep. 30, 1987 [FR] France ............................. 87 13490

[51] Int. Cl.⁴ .............................................. F02K 1/70
[52] U.S. Cl. ..................................... 60/226.2; 60/230; 239/265.29
[58] Field of Search ...................... 60/226.2, 230, 229; 239/265.31, 265.29, 265.27, 265.37; 244/12.5, 110 B

[56] References Cited

U.S. PATENT DOCUMENTS

| | | | |
|---|---|---|---|
| 3,262,268 | 7/1966 | Beavers | 60/230 |
| 3,605,411 | 9/1971 | Maison et al. | 60/226.2 |
| 3,690,561 | 9/1972 | Potter | |
| 3,774,868 | 11/1973 | Goetz | |
| 4,177,639 | 12/1979 | Taylor | 239/265.31 |
| 4,485,970 | 12/1984 | Fornier et al. | |

FOREIGN PATENT DOCUMENTS

| | | |
|---|---|---|
| 2030034 | 10/1970 | France |
| 2486153 | 1/1982 | France |
| 2506843 | 12/1982 | France |
| 2559838 | 8/1985 | France |
| 754808 | 8/1956 | United Kingdom |
| 1276265 | 6/1972 | United Kingdom ............ 239/265.29 |

Primary Examiner—Donald E. Stout
Attorney, Agent, or Firm—Bacon & Thomas

[57] ABSTRACT

A thrust reverser includes a thrust reversing door having maximum efficiency in both the closed, forward thrust position and the open, reverse thrust positions. An inner panel is pivotally attached to the thrust reverser door by a linkage mechanism such that, in the closed position, an interior surface of the inner panel is substantially flush with the interior surfaces of the housing defining the cold flow duct so as to minimize or eliminate any perturbations in the air flowing through the cold flow duct. When the door is moved to the opened position, the linkage mechanism interconnecting it to the inner panel causes the inner panel to pivot a greater amount so as to bring an upstream portion of the inner panel closer to an upstream portion of the door to expose the deflector and thereby increase the thurst reversing efficiency. The linkage mechanism interconnecting the inner panel with the door is completely contained between these elements and is also interconnected with the door actuator such that the actuator motion in moving the outer door between its opened and closed positions also serves to move the inner panel.

4 Claims, 5 Drawing Sheets

THRUST REVERSE FOR A TURBOFAN ENGINE

BACKGROUND OF THE INVENTION

The present invention relates to a thrust reverser for a turbofan-type turbojet engine, more particularly such a thrust reverser having a thrust reversing door structure that maximizes the efficiency of the engine both in the direct thrust and the reverse thrust modes.

Fan-type turbojet engines, commonly known at as turbofan engines, have a primary duct for exhausting hot engine gases and a secondary, or cold flow, duct concentrically arranged about the primary duct. The cold flow duct communicates with a fan driven by the turbojet engine to provide additional thrust by forcing air through the cold flow duct. The fan may be mounted at the front or near the rear portion of the turbojet engine.

In such turbofan engines having a relatively high bypass ratio, (i.e., the ratio between gases passing through the secondary duct and those gases passing through the primary duct) it is known to have a thrust reversing device acting on only the air passing through the cold flow duct.

A typical thrust reverser applied to the cold flow duct of a turbofan engine is illustrated in FIG. 1. The upstream portion of the housing which defines the outer limits of the cold flow duct and which is concentrically arranged about the primary duct (not shown) is designated as 1 and generally comprises an external housing panel 4, an internal housing panel 5 with frame 6 interconnecting the external and internal panels. The outer surface of external panel 4 defines an airflow surface over which air external to the engine, indicated by arrow 10, passes during flight of the aircraft. The inner surface of internal panel 5 defines the outer boundary of the cold flow duct through which air, indicated by arrow 15, passes.

A thrust reverser is illustrated generally at 2 and an downstream fairing of the housing is illustrated at 3. The thrust reverser 2, in known fashion, comprises a door 7 pivotally attached to the housing such that it is movable between a closed position, illustrated in FIG. 1, during the forward thrust operational mode of the engine, and an open position in which the upstream end of the thrust reverser door is moved radially outwardly into the external airstream, while the downstream portion is moved radially inwardly into the cold flow duct airstream so as to redirect the cold flow duct air laterally through an opening in the housing in a direction which has a reversing thrust component.

The actuator 7a for moving door 7 between its opened and closed positions may comprise an hydraulic cylinder extending through and mounted to frame member 6 and having an extendable and retractable piston rod connected to the thrust reverser door 7.

The thrust reverser door 7 has an outer door panel 9, and an internal door panel 11 joined together by internal structure 12. The upstream end of the door 7 has a deflector 13 to maximize the efficiency of the thrust reverser when the door 7 is in the opened, or thrust reversing position. When the door is in the closed, or forward thrust position as illustrated in FIG. 1, the outer door panel 9 has an external surface which substantially flush with those of upstream external panel 4 and downstream fairing cone 3. Although only one thrust reversing door 7 is illustrated in FIG. 1, it should be understood that more than one door may be utilized, depending upon the operational characteristics of the aircraft engine and the aircraft with which the thrust reversing structure is associated.

In order to maximize the efficiency of the thrust reversing door when in the open position, the deflector 13 must extend beyond the inner surface of internal door panel 11. Thus, the radial distance between upstream portions of the outer door panel 9 and the internal door panel 11 is somewhat less than the radial distance between downstream portions of these panels. While this maximizes the efficiency the thrust reversing position, it creates problems when the door 7 is in the closed position. By locating the external door panel 9 substantially flush with the upstream and downstream external surfaces, external air flow, indicated by arrow 10 passes over the outer surface of the housing with minimal disruptions or perturbations. However, the orientation of the internal door panel 11 creates a cavity 16 defined by the internal door panel 11, the deflector 13, the deflecting edge 8 and the theoretical line 14 interconnecting the internal surfaces of the housing and the downstream rear fairing cone. Line 14 indicates an ideal surface that would minimize the disruptions and perturbations in the air flow 15 flowing through the cold flow duct. A portion of the air in the cold flow duct follows the deflecting edge 8 and enters cavity 16, thereby creating aerodynamic deficiencies in air flow through the cold flow duct which are detrimental to the operation of the device in the forward thrust mode. Such typical examples of thrust reversers can be found in U.S. Pat. No. 4,485,970 to Fournier et al as well as in French patent Nos. 2,486,153; 2,559,838; and 2,030,034.

U.S. Pat. No. 3,605,411 to Maison et al describes a thrust reverser having pivoting doors for deflecting the cold flow air passing through the cold flow air duct through a lateral opening in the housing. In this device, the outer door panel and the internal door panel are separately pivotally attached to the stationary housing such that each pivots about a different axis. This enables a differential pivoting movement between the respective panels to expose a portion of the upstream deflector when the door is in the thrust reversing mode and to align the internal door panel with the internal surfaces of the housing at upstream and downstream locations from the door when in the forward thrust mode. While the device has somewhat alleviated the problems associated with the other prior art devices, the separate mountings of the door panel and the mechanism for actuating the panels has proven to be rather complex, thereby decreasing the reliability and safety of the system.

SUMMARY OF THE INVENTION

The thrust reverser according to the present invention provides a thrust reversing door having maximum efficiency in both the closed, forward thrust position and the open, reverse thrust position. An inner panel is pivotally attached to the thrust reverser door by a linkage mechanism such that, in the closed position, an interior surface of the inner panel is substantially flush with the interior surfaces of the housing defining the cold flow duct so as to minimize or eliminate any perturbations in the air flowing through the cold flow duct.

When the door moved to the opened position, the linkage mechanism interconnecting the door and the inner panel causes the inner panel to pivot a greater amount so as to bring an upstream portion of the inner panel closer to an upstream portion of the door to expose the deflector and thereby increase the thrust reversing efficiency.

The linkage mechanism interconnecting the inner panel with the door completely contained between these elements and also interconnected with the door actuator such that the actuator motion in moving the outer door between its opened and closed positions also serves to move the inner panel.

In a first embodiment of the invention, a first link interconnects the end of the actuator piston rod, which is also connected to the thrust reverser door, and a downstream portion of the inner panel. An upstream portion of the inner panel is connected to the internal door panel by a pair of second links.

In a second embodiment, the first link again connects the piston rod to the inner panel while downstream of this connection, a hinge mechanism interconnects the inner panel to the door. The hinge has a pivot axis extending substantially transverse to the longitudinal axis of the engine.

In a third embodiment, the inner panel is pivotally attached to the thrust reverser door at lateral extremities so as to pivot about an axis extending substantially transversely of the longitudinal axis of the engine. A connecting link has a first portion pivotally attached to an upstream portion of the inner panel while an opposite end portion of this link is slidably received in a guide attached to the upstream portion of the door. A third link interconnects the second link with the first link, which is attached to the end of the actuator piston rod.

In each of the embodiments, the invention provides a door having an inner wall which is substantially flush with the inner surface of the upstream and downstream housing portions and is substantially aligned with the theoretical flow line to provide the maximum aerodynamic efficiency when the door is in the forward thrust mode. The mechanism also provides a door that maximizes the efficiency in the thrust reversing mode.

A BRIEF DESCRIPTION OF THE DRAWINGS

DETAILED DESCRIPTION OF THE PREFERRED EMBODIMENTS

Figure 1:
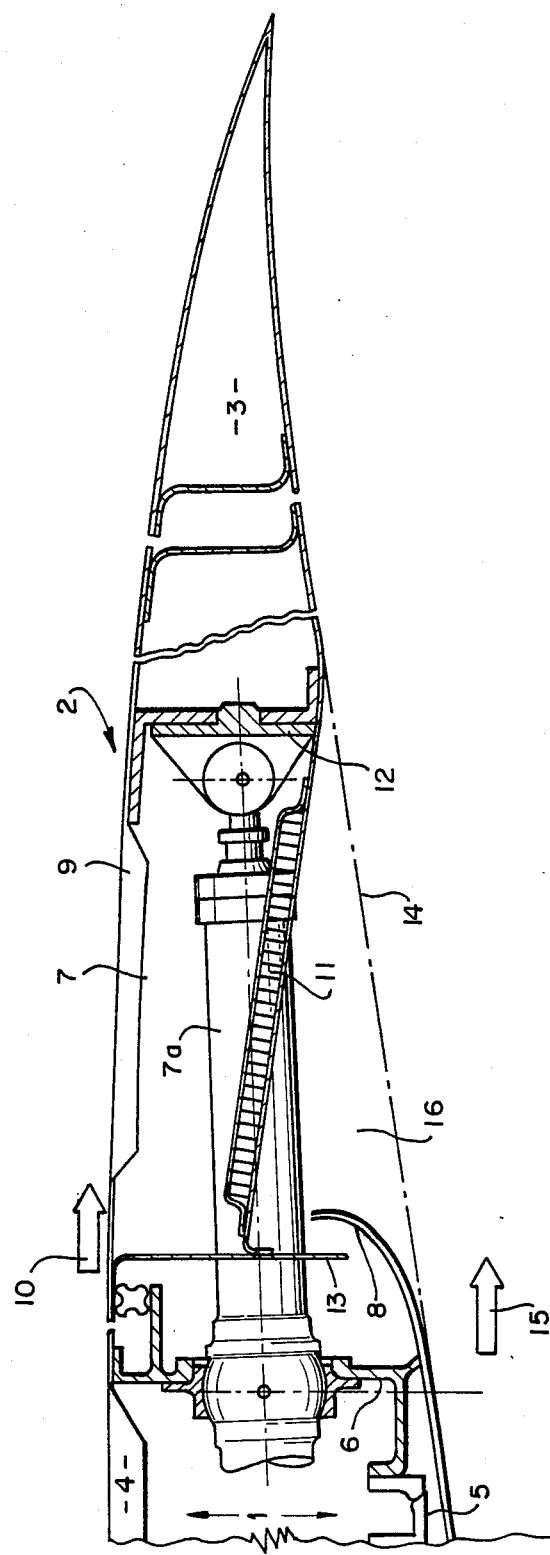
FIG. 1 is a partial, longitudinal sectional view showing the outer housing of a turbofan engine having a thrust reversing door of known construction.
Figure 2:
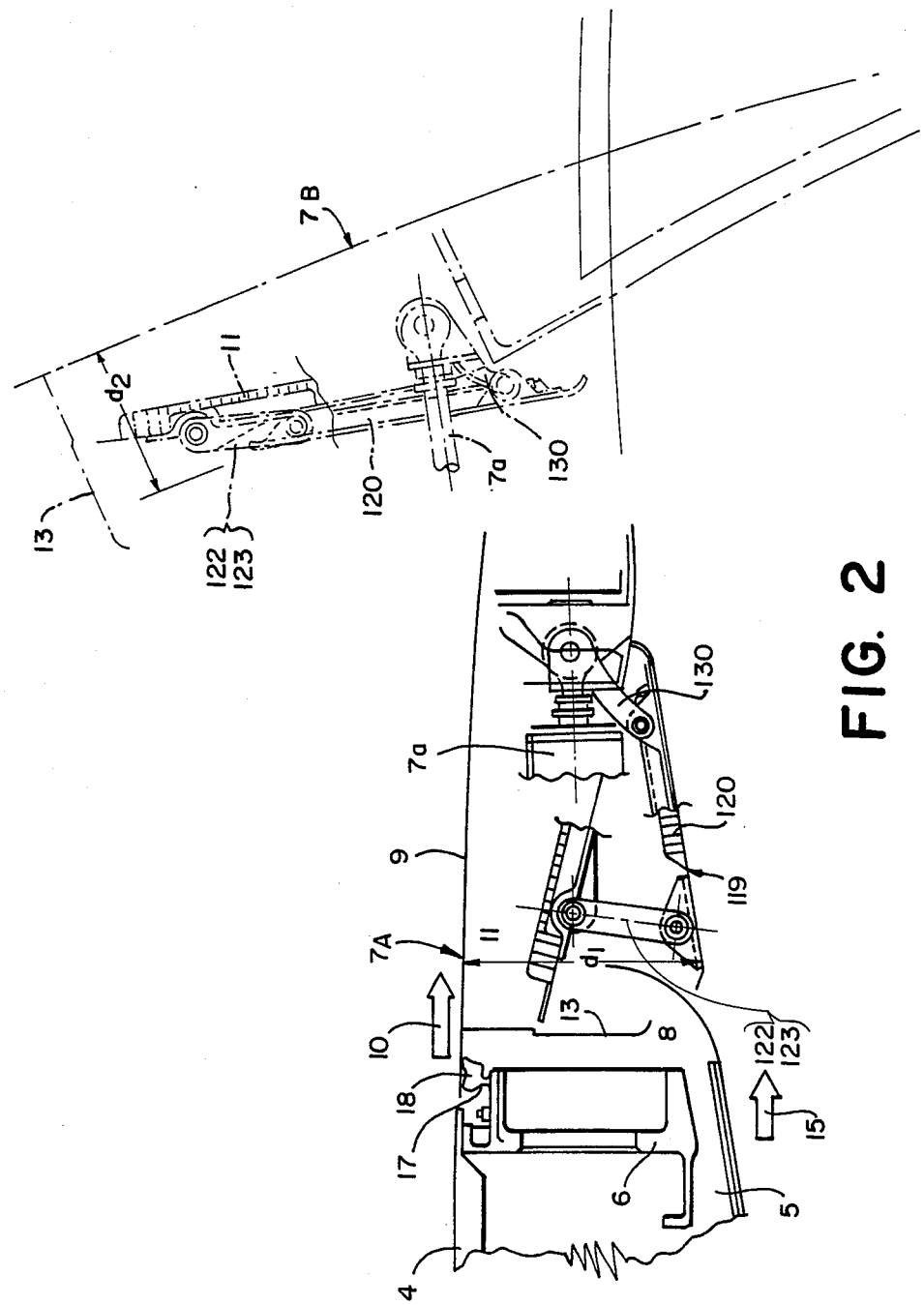
FIG. 2 is a partial, longitudinal sectional view illustrating a first embodiment of the thrust reversing door according to the invention in the closed and opened positions.

The first embodiment of the invention is illustrated in FIG. 2. The elements common to the known device, illustrated in FIG. 1, have been assigned the same numbers. As in the known devices, the thrust reversing door according to the invention is associated with a housing having an external panel 4, an internal panel 5 which defines the outer limits of the cold flow air duct, and a frame member 6 interconnecting these elements. The thrust reversing door 7 has an outer panel 9 which, in the closed position, is substantially flush with the outer surface of external panel 4 of the housing. In this particular embodiment, the internal door panel 11 has generally the same orientation as that of the known device illustrated in FIG. 1.

The thrust reversing door 7 has a seal and support element 18 attached to its upstream edge which cooperates with a support element 17, mounted on frame 6 to form a seal when the door 7 is in its closed position.

An inner panel 120 having an internal surface 119 is attached to the door 7 such that, when the door 7 is in its closed position, the internal surface 119 of the inner panel 120 lies substantially along the theoretical airflow line 14, illustrated in FIG. 1. Thus, air flowing through the cold flow duct in the direction of arrow 15 does not enter the cavity 16, as in the known devices, thereby minimizing air flow disturbances. The inner panel 120 is connected to the door 7 via a linkage mechanism comprising a first link 130 which pivotally interconnects a downstream portion of the inner panel 120 to the end of the piston rod of actuator 7a. An upstream portion of the inner panel 120 is connected to the door 7 via links 122 and 123. Links 122 and 123 are pivotally attached at their ends between inner panel 120 and internal door panel 11 so as to be freely pivotable with respect to these elements.

The solid lines in FIG. 2 illustrate the thrust reverser door 7 in its closed position, while the thrust reverser door is illustrated in its open position by the dashed lines.

The thrust reverser door 7 is moved between its respective positions by the extension or contraction of the piston rod of cylinder 7a. As the piston rod is extended, door 7 pivots about its attachment points to the housing (not shown) toward the position illustrated in dashed lines in FIG. 2. As in the known devices, the downstream portion of the door 7 extends inwardly into the cold flow air duct so as to block this duct and direct the air outwardly through a lateral opening in the housing. The deflector 13 serves to impart a forward direction to this air, thereby providing the requisite reverse thrust. As the door 7 moves towards its opened position, the inner panel 120 moves to a position against the internal door panel 11 so as to prevent its blocking the deflector 13. The inner panel 120 pivots about its attachment to the first link 130, thereby causing the links 122 and 123 to pivot so as to direct the upstream portion of the inner panel 120 toward the door. As is clearly illustrated in this figure, the radial distance $d_1$ between an upstream portion of the inner panel 120 and the outer door panel 9 when the door is in its closed position, is substantially greater than a corresponding distance $d_2$ when these elements are in their opened positions.

The specific interrelationships of the link attachment points will of course, vary somewhat according to the size and shape of the thrust reversing door, and the length of stroke of the piston rod for each particular application of the invention. However, it is believed that such locations will be readily ascertainable so as to enable the internal surface 119 of inner panel 120 to march the theoretical flow line profile when the door is in its closed position and to be drawn against the inner door panel when the door is in its opened position.

Figure 3:
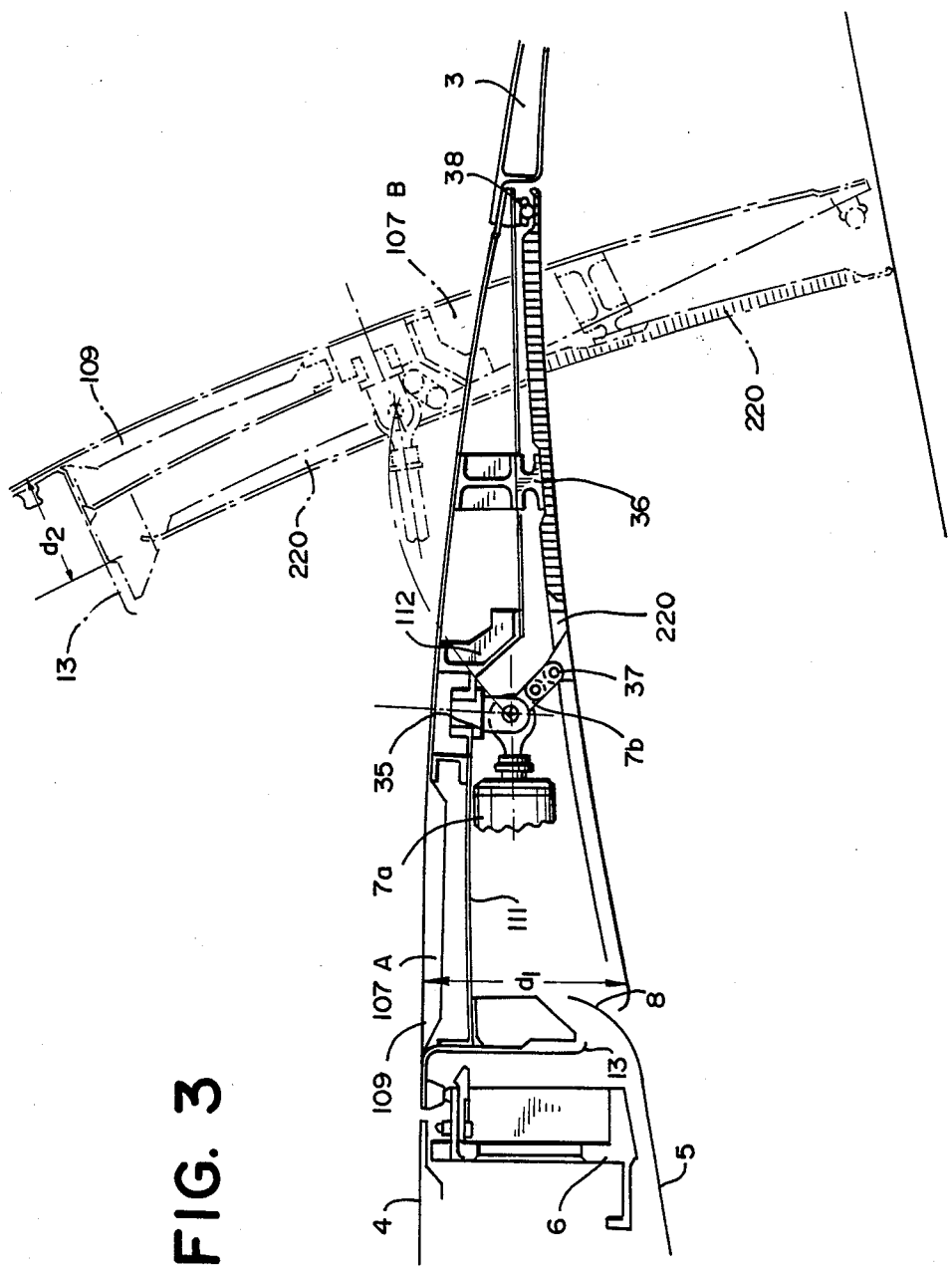
FIG. 3 is a partial, longitudinal sectional view illustrating a second embodiment of the invention showing the thrust reversing door in both opened and closed positions.

In the embodiment illustrated in FIG. 3, a modified door construction 107 is utilized to which the inner panel 220 is attached. Door 107 is modified so as to displace the point of application of the piston rod of cylinder 7a to a support 35 attached to the door 107 in a position inwardly of internal door panel 111. The thickness of the door 107 bet outer door panel 109 and the internal panel 111 is reduced, thereby enabling the inner panel 220 to extend substantially along the entire axial length of the door 107.

A downstream portion of the inner panel 220 is connected to the door 107 by a straight hinge 36 whose hinge pivot axis extends substantially transverse to the longitudinal axis of the housing. A single link 37 interconnects the end of the piston rod 7b and the inner panel 220 upstream of the hinge 36. The downstream portions of the door 107 and the inner panel 220 also carry seal members 38 to prevent air leakage through this juncture. As in the previous embodiment, the geometry of the interconnection between the inner panel 220 and the door 107 is such that, as the door 107 moves to its open position, illustrated in dashed lines in FIG. 3, the distance d between the upstream edges of inner panel 220 and the door 107 decreases so as to expose the deflector 13 to the air flow passing through the lateral opening in the housing.

Figure 4:
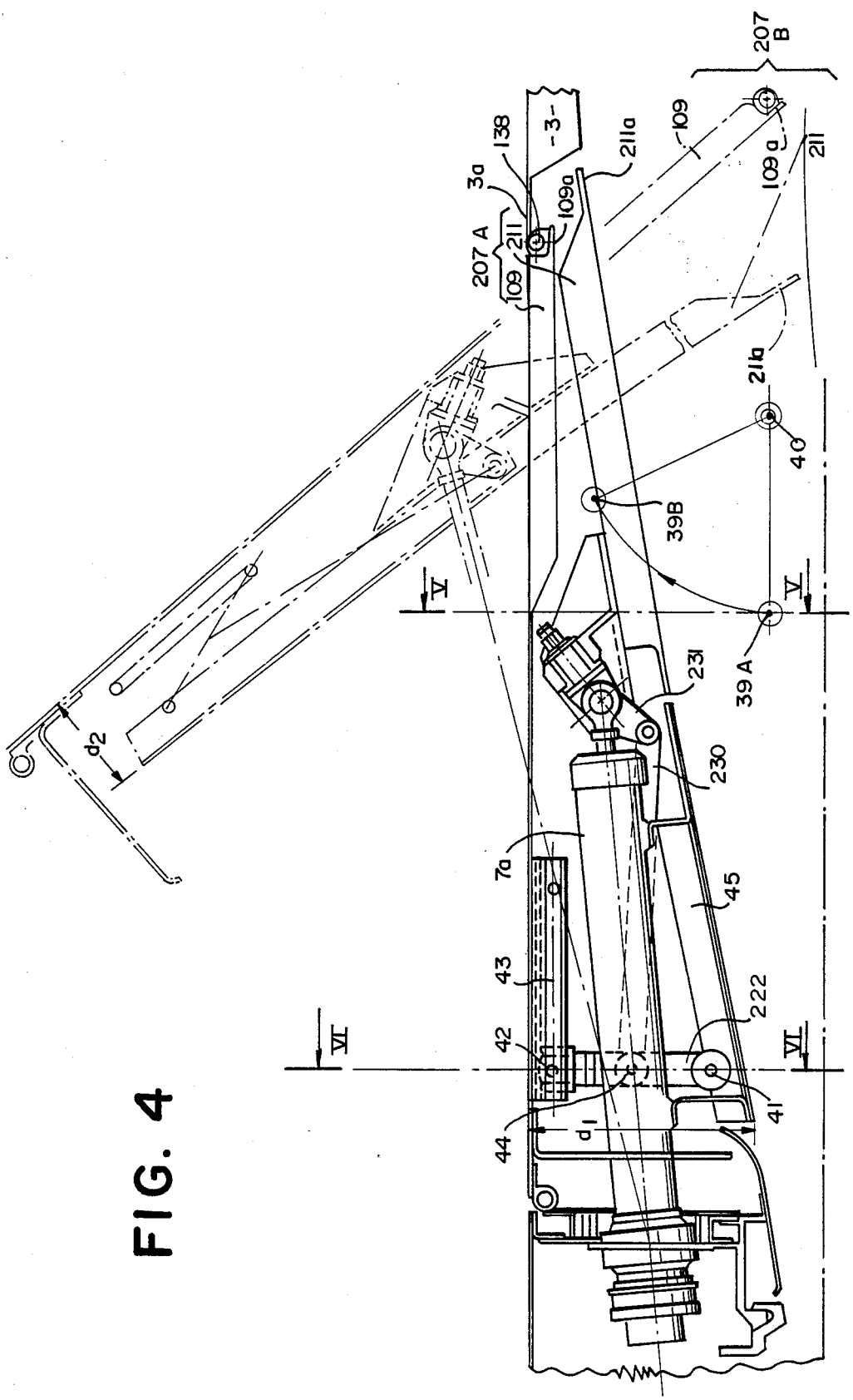
FIG. 4 is a partial longitudinal sectional view showing a third embodiment of the invention with the thrust reversing door in the opened and closed positions.
Figure 5:
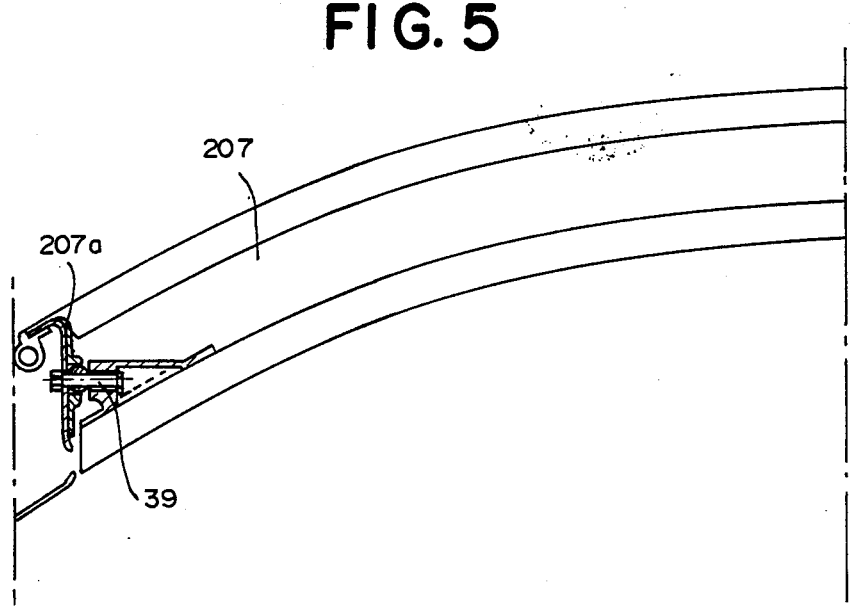
FIG. 5 is a partial, cross-sectional view taken along link V—V in FIG. 4.
Figure 6:
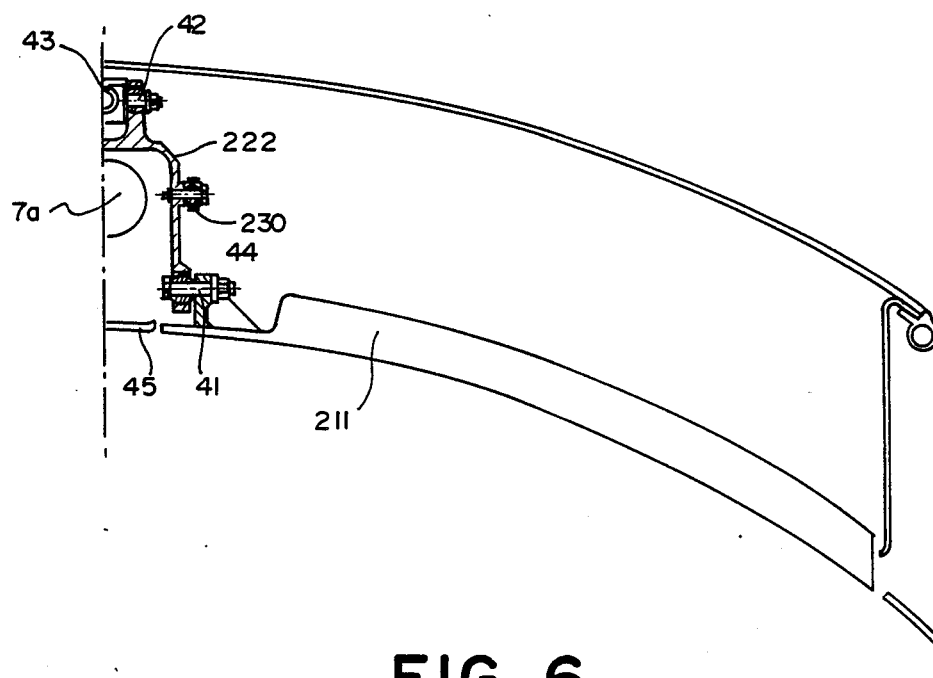
FIG. 6 is a partial, cross-sectional view taken along line VI—VI in FIG. 4.

A third embodiment of the invention is illustrated in FIGS. 4-6. In this embodiment, the thrust reversing door 207 comprises an outer door panel 109 and an inner panel 211 capable of relative pivoting movement with respect to the outer door panel 109. During this relative pivoting movement as the door 207 is moved toward its opened position, again illustrated in dashed lines in FIG. 4, the downstream edge 211a is moved away from the downstream edge 109a. The downstream edge 109a has a seal 138 interposed between it and the downstream fairing cone 3 to prevent leakage of air through the juncture.

The internal panel 211 is pivotally attached to the outer door panel 109 at pivots 39 located at the lateral edges of the respective panels. Door 207 is attached to the housing so as to pivot about pivot point 40, shown in FIG. 4. As in the previous embodiments, the door 207 is caused to pivot by the extension and retraction of the piston rod of actuating cylinder 7a.

Link 222 is pivotally attached to an upstream portion of the inner panel 211 by pivot 41 and has a second, opposite end slideably attached to guiderail 43 by sliding support member 42. Thus, the radially outermost end of link 22 is constrained to move in a straight line by the guiderail 43. Link 230 interconnects the link 222 via pivot 44 with the first link 231 tot he end of the piston rod.

As illustrated in FIG. 6, link 222 may have a generally "U" shape with the legs of the U extending on either side of the actuating cylinder 7a. The base of the "U" is attached to the guiderail 43 via support pins 42. As in the previous embodiments, extension of the piston rod of cylinder 7a causes the upstream portion of door 207 to pivot radially outwardly and the downstream portion to pivot inwardly into the cold flow duct as to redirect the air through the lateral opening of the housing. Again, the deflector 13 imparts a forward direction to the redirected air to provide the reverse thrust. As can be seen in FIG. 4, the linkage configuration is such that the distance $d_1$ between the upstream portions of the inner panel 211 and the outer door panel 109 decreases from $d_1$ to $d_2$ as the door is moved from the closed position into the opened position. When in the closed position, the internal surface of the inner panel 211 follows the theoretical line to provide a disturbance-free surface between the upstream housing and the downstream fairing cone portions so as to minimize any perturbations in the airflow.

A supplementary inner panel 45 may be fixedly attached to the cylinder 7a to cover a gap formed in the inner panel 211 to provide for clearance between the inner panel 211 and the cylinder 7a as the door is opened and closed. Thus, when the door is in the closed position, supplementary panel 45 will close this gap in the inner panel to provide a smooth airflow surface. Such a panel may be also utilized in conjunction with the previously described embodiments so as to maximize the efficiency of the airflow through the cold flow duct when the doors are in their closed positions.

The foregoing description is provided for illustrative purposes only and should not be construed as in any way limiting this invention, the scope of which is defined solely by the appended claims.

What is claimed is:

1. In a fan-type turbojet engine having a housing with an outer surface and an inner surface defining the radially outer limits of an axial cold flow airstream from the fan wherein the housing defines at least one substantially laterally facing thrust reversing opening, the improved thrust reversing mechanism comprising:
   (a) an outer door pivotally attached to the housing so as to be movable between a first, closed position wherein the outer door closes the thrust reversing opening and an external surface of the outer door is substantially flush with the outer surface of the housing, and a second, opened position wherein the thrust reversing opening is opened;
   (b) actuating means interposed between the housing and the outer door to move the outer door between its first and second positions comprising a jack mechanism having a cylinder affixed to the housing, and an extendible and retractable piston rod connected to the outer door;
   (c) an inner panel disposed radially inwardly of the outer door; and,
   (d) attaching means attaching the inner panel to the outer door such that, as the outer door moves between its first and second positions, the inner panel is moved between a first, closed position wherein the inner panel is substantially flush with the inner surface of the housing and the radial distance between upstream portions of the inner panel and the outer door is $d_1$, and a second, opened position wherein the distance between upstream portions of the inner panel and outer door is $d_2$ such the $d_2 < d_1$ wherein the attaching means comprises at least one first link pivotally interconnecting the piston rod and a downstream portion of the inner panel and at least one second link having ends pivotally connected to upstream portions of the inner panel and the outer door.

2. The improved thrust reverser according to claim 1 further comprising hinge means interconnecting the inner panel and the outer door so as to pivot about a hinge axis extending generally transverse to a longitudinal axis of the housing.

3. The improved thrust reverser according to claim 2 wherein the hinge axis is located downstream of the first link.

4. The improved thrust reverser according to claim 1 wherein the attaching means further comprises:
   (a) means connecting the first link to the piston rod;

(b) a guide rail attached to an upstream portion of the outer door;

(c) means pivotally attaching a first end of the second link to an upstream portion of the inner panel and means slidably attaching a second end to the guide rail;

(d) a third link pivotally connected to the second and first links; and, (e) pivot means pivotally interconnecting the inner panel and the outer door.

* * * * *

UNITED STATES PATENT AND TRADEMARK OFFICE
CERTIFICATE OF CORRECTION

PATENT NO. : 4,916,895
DATED : April 17, 1990
INVENTOR(S) : Dubois

It is certified that error appears in the above-identified patent and that said Letters Patent is hereby corrected as shown below:

The title should read:

"THRUST REVERSER FOR A TURBOFAN ENGINE"

Column 1, line 10, after "known" delete "at".

Column 1, line 39, after "and" delete "an".

Column 2, line 11, after "efficiency" insert --in--.

Column 2, line 65, after "door" insert --is--.

Column 4, line 64, change "march" to "match".

Column 5, line 5, change "bet" to "between the".

Column 5, line 50, change "tot he" to "to the".

Column 6, line 51, after "such" change "the" to "that".

Signed and Sealed this

Twenty-sixth Day of November, 1991

Attest:

HARRY F. MANBECK, JR.

Attesting Officer     Commissioner of Patents and Trademarks